May 25, 1971 ISAO MORIOKA 3,580,758

METHOD FOR REPRODUCING THREE-DIMENSIONAL IMAGE

Filed May 8, 1968 3 Sheets-Sheet 1

INVENTOR.
ISAO MORIOKA
BY Otto John Munz.
ATTORNEY

INVENTOR.
ISAO MORIOKA
BY Otto John Munz
ATTORNEY

May 25, 1971 ISAO MORIOKA 3,580,758

METHOD FOR REPRODUCING THREE-DIMENSIONAL IMAGE

Filed May 8, 1968 3 Sheets-Sheet 3

INVENTOR.
ISAO MORIOKA

BY Otto John Munz

ATTORNEY

United States Patent Office 3,580,758
Patented May 25, 1971

3,580,758

METHOD FOR REPRODUCING THREE-DIMENSIONAL IMAGE

Isao Morioka, 3-23 Ookagma 2-chome Meguro-ku, Tokyo, Japan

Filed May 8, 1968, Ser. No. 727,419
Claims priority, application Japan, May 9, 1967, 42/29,325; May 15, 1967, 42/30,706
Int. Cl. B44b *1/00*
U.S. Cl. 156—58 3 Claims

ABSTRACT OF THE DISCLOSURE

A method for reproducing a three-dimensional image comprising the steps of projecting on an object screens each consisting of a plurality of parallel lines as schematically shown in FIG. 6–*c*, photographing said object O having the shades in the form of curved lines formed thereupon by said projection so as to resolve the surface of said object into a multitude of curved lines, thereafter projecting thus obtained photographs and said screens at the same time upon a body of clay, and applying clay to or removing clay from said body in such a manner that said curved lines are concentrated or converged upon the surface of said body and are appearing there as straight lines, when viewed from the screen side.

BRIEF SUMMARY OF THE INVENTION

The inventor has disclosed for the past fourty-five years the methods for reproducing a three-dimensional image similar in shape to an object by utilizing more than three photographs upon which are photographed the images of said object.

The first invention of the type described is U.S. Patent No. 1,719,483, and the principle of the invention is shown in FIG. 6–*a* of the present specification. According to the first invention, an object O is rotated while the light beams in the form of an extremely thin line plate are projected in the direction toward the axis of rotation of said object. The curved lines C formed upon the surface of said object by the light beams are photographed in a plurality of pictures so as to resolve the surface of said body into a multitude of curved lines C. Thereafter the curved lines thus obtained are collected upon a surface of a body of a material which is to be formed into a shape similar to that of said object.

The second invention of the inventor is disclosed in U.S. patents 1,853,072; 2,015,457; 2,066,996; 2,350,796 and 3,185,602, and the principle of the second invention is shown in FIG. 6*b*. According to the second invention, an object O is not rotated. Several cameras surround the object O so as to photograph a multitude of points, for example the Point P, on the surface of the object O. Next two positive pictures each bearing the image of the point P are projected upon the surface of a body of clay. Clay is applied to or removed from the body in such a manner that the intersection of the projected lights of the point P from both of the pictures is located upon the surface of the body of clay, thereby obtaining a three-dimensional image. Thus, according to the second invention, the surface of an object is resolved into a multitude of points and thereafter these points are again collected on the surface of a body of a clay.

The present invention has for its object to provide a method which is simpler than those disclosed in the first and second inventions of the inventor described above.

The principle of the present invention for reproducing a three-dimensional image is shown in FIG. 6*c*. First screens each consisting of a plurality of parallel lines are projected upon the surface of an object O, and the object O having the shades of curved lines upon the surface thereof is photographed on a plurality of pictures so that the surface of the object O is resolved into a multitude of curved lines S. Thereafter, the above described screens and pictures thus obtained are projected upon the surface of a body of clay in such a manner that clay is applied to or removed from the body of clay in order that the above described curved lines S may be composed or converged upon the surface of the body of clay. The present invention therefore provides a method much simpler than the first and second inventions of the inventor.

BRIEF DESCRIPTION OF THE DRAWINGS

The above and other features, advantages and effects of the present invention will be more readily understood from the following description taken in conjunction with the accompanying drawings in which.

DETAILED DESCRIPTION OF THE INVENTION

Figure 1:
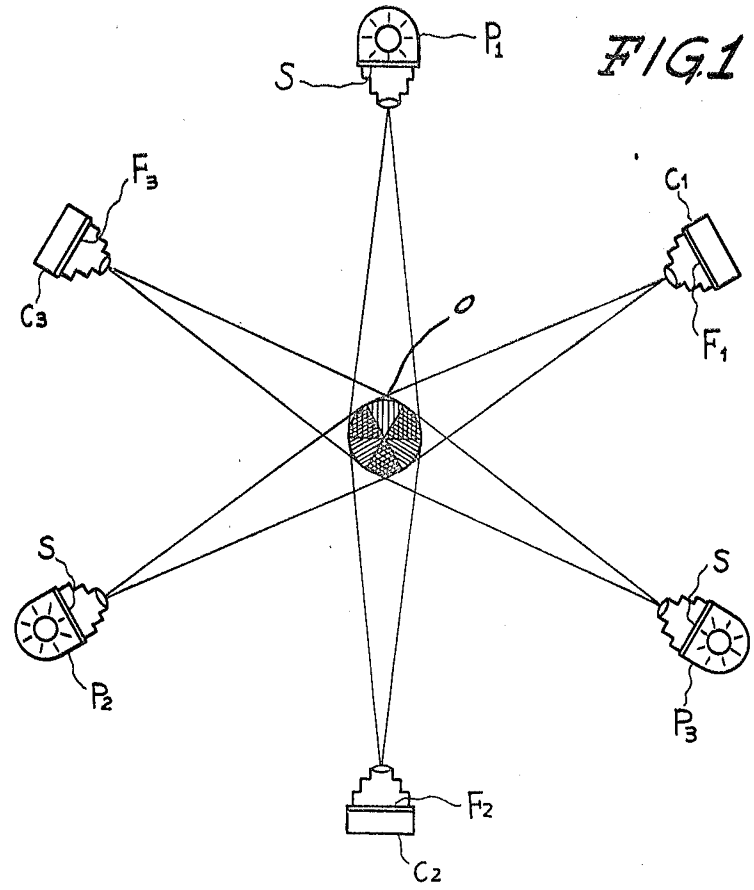
FIG. 1 is a schematic plan view illustrating the photographing step according to the present invention.
Figure 2:
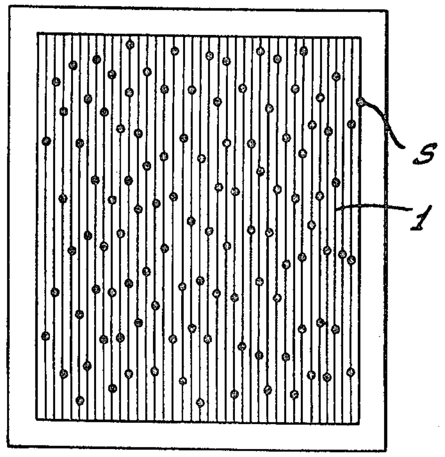
FIG. 2 is a front view of a screen which is projected upon an object.
Figure 3A:
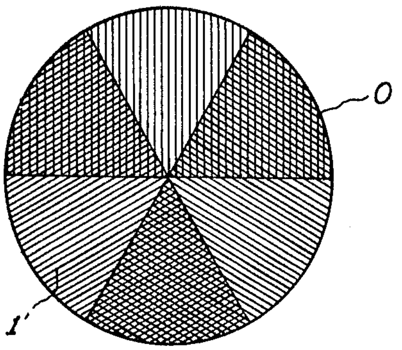
FIG. 3*a* is an enlarged plan view illustrating the images of screens upon the object obtained in the step shown in FIG. 1.
Figure 3B:
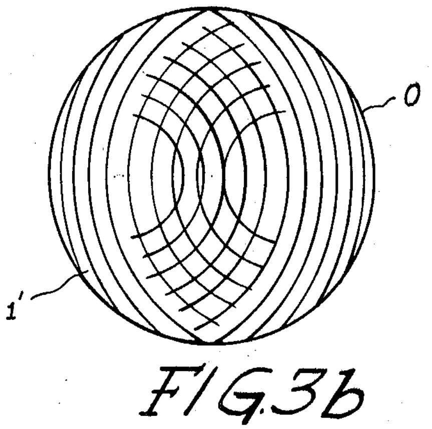
FIG. 3*b* is a front view of FIG. 3*a*, the curved lines in the circle being shown as circular arcs for the sake of convenience for illustration even though they should be elliptical arcs.

The present invention relates to a method for reproducing a three-dimensional image comprising a photographing step as shown in FIG. 1 in which the screens *s* shown in FIG. 2 each consisting of a plurality of parallel lines 1 are projected by means of projectors $P_2$, $P_2$, $P_3$, . . . upon the surface of an object O as shown in FIGS. 3*a* and 3*b* to form the curved lines 1' which are the images of the screens *s* and photographed by means of cameras $C_1$, $C_2$, $C_3$, . . . upon the films $F_1$, $F_2$, $F_3$.

Figure 4:
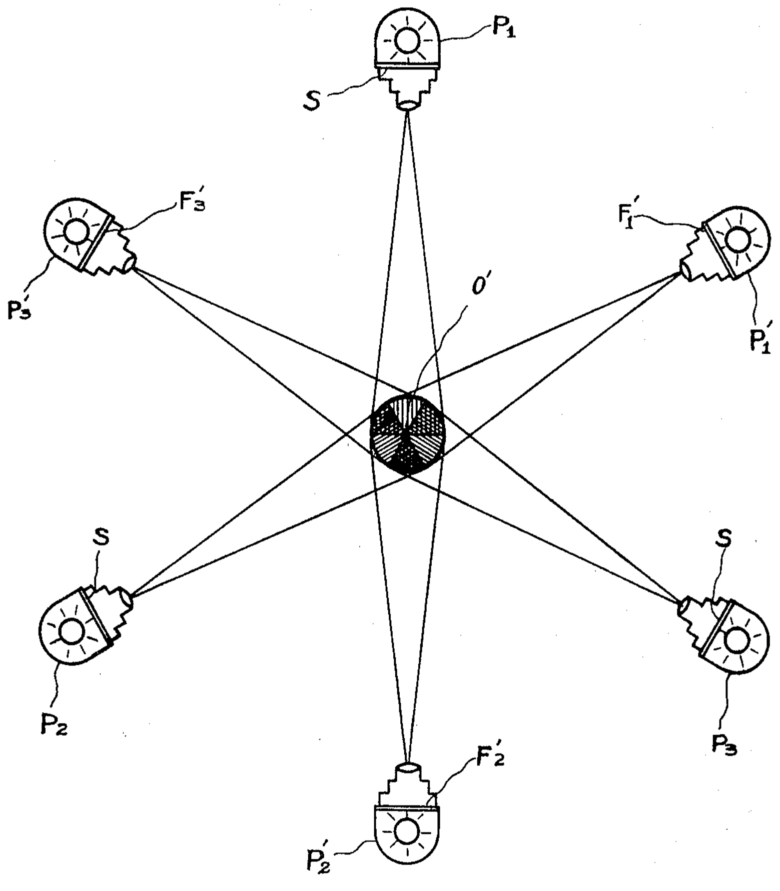
FIG. 4 is a plan view illustrating the step of reproducing three-dimensional image according to the present invention.
Figure 5:
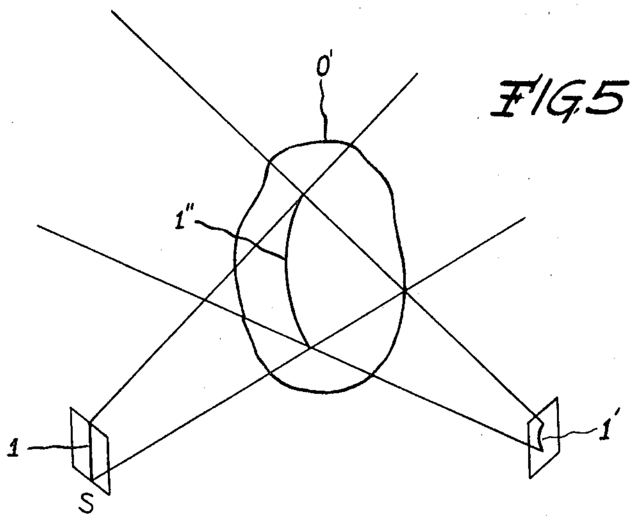
FIG. 5 is a schematic view illustrating the principle of the step shown in FIG. 4.
Figure 6:
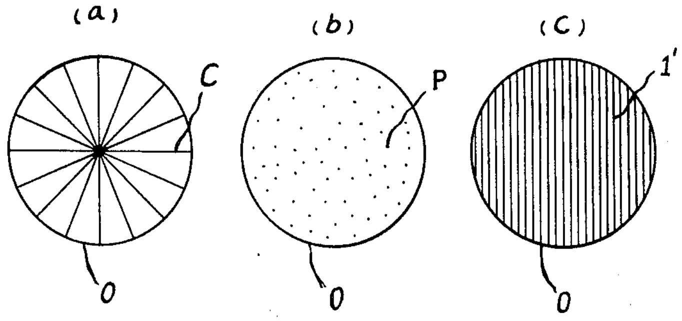
FIGS. 6*a* and 6*b* show the principles of the method for reproducing a three-dimensional image respectively disclosed by the inventor in the past.
FIG. 6*c* shows the principle of the present invention, all views in FIG. 6 being shown as plan views and the object of reproduction in the accompanying drawings being shown as a spherical body.

A three-dimensional image reproduction step is shown in FIG. 4 in which positive films $F_1'$, $F_2'$, $F_3'$, . . . of the negatives $F_1$, $F_2$, $F_3$, . . . are projected upon the surface of a body of a material such as clay by means of projectors $P_1'$, $P_2'$, $P_3'$, . . . Each positive respectively is located in a position corresponding to the positions of said cameras $C_1$, $C_2$, $C_3$, . . . of the prior step and each projector is in a relative position similar to the relative positions of the projectors $P_1$, $P_2$, $P_3$ . . . shown in FIG. 1, as shown in FIG. 5 in the reproduction the material is further applied to or removed from said body in such a manner that the curved lines 1'' which are formed by the intersections of the light beams, each projecting the line 1 of the screen *s* and the light beams each projecting the curved line 1' which is the image of the line 1, projected and formed upon the surface of the object O and photographed, are correctly located upon the surface of said body.

It will be clearly understood that according to the present invention, the number of pictures which must be photographed in the first and second inventions described above can be reduced into one half. Furthermore, the present invention provides a method which is much simpler as compared with the conventional method because the reproduction can be effected by just following each of the curved lines 1''.

The essential features of the invention have been described in this specification without restricting the invention in minor details, materials and proportions other than by the scope of the following claims.

What is claimed is:

1. A method of producing from a sculpture material a sculpture reproduction of an object comprising:

an information collecting stage and a reproduction stage, said information collecting stage including the steps of:

providing a plurality of cameras and screens, each having a plurality of spaced parallel lines together with a plurality of projectors, one camera and one projector of said screen for each screen, within a projecting distance from said object, said camera, screens and projectors surrounding at least a portion of said object spaced from each other and in fixed positions relative to each other and relative to said object;

projecting said lines upon said object to form upon said object corresponding reference lines, each curved in accordance with the respective curvatures of said object upon which they impinge, and photographing said reference lines to obtain a plurality of transparencies thereof; one from each said camera;

and a reproduction stage, including the steps of providing said sculpture material and a plurality of projectors spaced in fixed positions relative to each other at distances and angles analogous to those of said collecting stage;

projecting said transparencies upon said sculpture material and sculpturing said material by adding to it and removing therefrom to conform the curvatures of said reference lines with the several peripheries of said sculpture material, until each peripheral line, viewed from the direction of the projector from which it originated coincides with its reference line.

2. A method of producing from a sculpture material a sculpture reproduction of an object as in claim 1, the fixed position of each said one camera, associated projector and the respective screen in said information collecting stage being fixed to have a common focussing point; each set of a camera, projector and screen being spaced from the same adjoining sets equidistantly and all the sets surrounding said object spaced equidistantly therefrom and said projectors with their respective transparencies in said reproduction stage arranged in sets of one projector and one transparency having common focussing points and being spaced equidistantly from each other and each set of a projector and transparency being spaced equidistantly from the said sculpturing material.

3. A method for reproducing a three-dimensional image comprising a photographing step in which screens, each consisting of a plurality of parallel lines (1), are projected by means of projectors ($P_1$, $P_2$, $P_3$, . . .) upon the surface of an object (O) to form the curved lines (1'') which are the images of said screens (*s*) and photographed by means of cameras ($C_1$, $C_2$, $C_3$, . . .) upon films ($F_1$, $F_2$, $F_3$, . . .);

and then the said lines are taken upon said films as curves 1' and a three-dimensional image reproduction step in which positive films ($F_1'$, $F_2'$, $F_3'$, . . .) of said films ($F_1$, $F_2$, $F_3$, . . .) are projected upon the surface of a body of material such as clay by means of projectors ($P_1'$, $P_2'$, $P_3'$, . . .) each of which is located respectively, instead of said cameras ($C_1$, $C_2$, $C_3$, . . .) in a relative position similar to the relative positions of said projectors ($P_1$, $P_2$, $P_3$, . . .) to the relative positions of said projectors ($P_1$, $P_2$, $P_3$, . . .) and said cameras ($C_1$, $C_2$, $C_3$, . . .), and said films each $F_1'$, $F_2'$ or $F_3'$ . . . is projected ordinary to said material and said material is further applied to or removed from said body until each of said curves 1'' on the material O' are seen as straight lines 1 each, seeing from the direction of each straight line projected by said projectors ($P_1'$, $P_2'$, $P_3'$, . . .).

References Cited

UNITED STATES PATENTS

| | | | |
|---|---|---|---|
| 2,350,796 | 6/1944 | Morioka | 156—58 |
| 2,502,697 | 4/1950 | Blain | 156—58 |
| 3,085,923 | 4/1963 | Agnew | 156—58 |
| 3,399,993 | 9/1968 | Agnew | 156—58 |

VERLIN R. PENDEGRASS, Primary Examiner